United States Patent [19]

Dargene

[11] E Re. 30,717

[45] Reissued Aug. 25, 1981

[54] QUICKLY ATTACHABLE AND DETACHABLE HINGE ASSEMBLY

[75] Inventor: Carl J. Dargene, Rockford, Ill.

[73] Assignee: Amerock Corporation, Rockford, Ill.

[21] Appl. No.: 103,515

[22] Filed: Dec. 13, 1979

Related U.S. Patent Documents

Reissue of:

[64] Patent No.: 3,590,419
Issued: Jul. 6, 1971
Appl. No.: 735,127
Filed: Jun. 6, 1968

[51] Int. Cl.[3] ..... E05D 5/06

[52] U.S. Cl. ..... 16/135

[58] Field of Search ..... 16/135, 130, 158, 149, 16/189; 151/69; 403/21

[56] References Cited

U.S. PATENT DOCUMENTS

| | | | |
|---|---|---|---|
| 386,186 | 7/1888 | Dahlman | 16/131 |
| 782,366 | 2/1905 | Stroud | 151/69 |
| 1,026,035 | 5/1912 | Hedden | 151/69 |
| 2,027,888 | 1/1936 | Solomon | 16/130 |
| 2,729,884 | 11/1956 | Mautone | 151/69 |
| 2,972,166 | 2/1961 | Johnson | 16/189 |
| 3,018,861 | 1/1962 | Somville | 189/36 |
| 3,479,070 | 11/1969 | Marateck et al. | 151/41.76 X |

*Primary Examiner*—Doris L. Troutman
*Attorney, Agent, or Firm*—Leydig, Voit, Osann, Mayer & Holt, Ltd.

[57] ABSTRACT

A quickly attachable and detachable hinge assembly for hanging a swinging door on a cabinet includes a retainer insertable into a slot in the edge of the door and adapted to be clamped to the door by a bolt extending through an opening in the face of the door and threaded into the retainer. By loosening the bolt slightly, the retainer may be unclamped from the door to permit removal of the latter from the hinge assembly and the cabinet. Another version of the hinge assembly is quickly and easily attachable to the cabinet as well as the door.

14 Claims, 22 Drawing Figures

Fig. 13
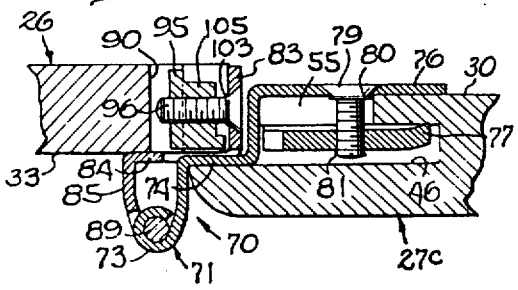
Fig. 14
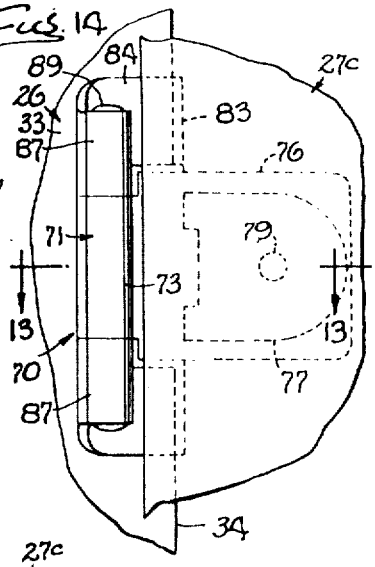
Fig. 15
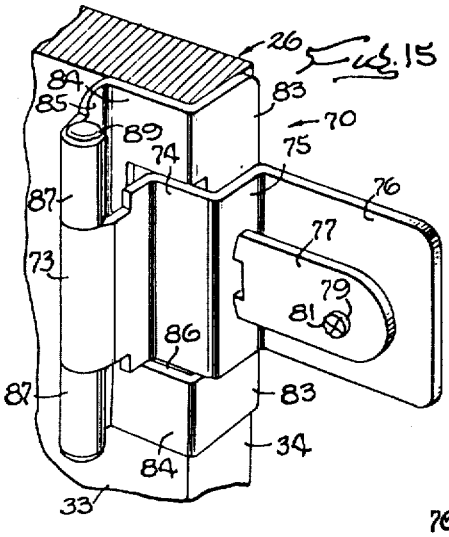
Fig. 16
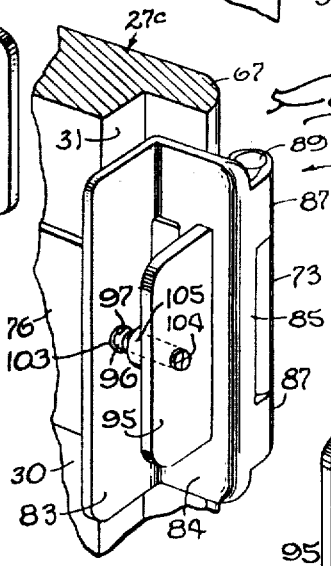
Fig. 18
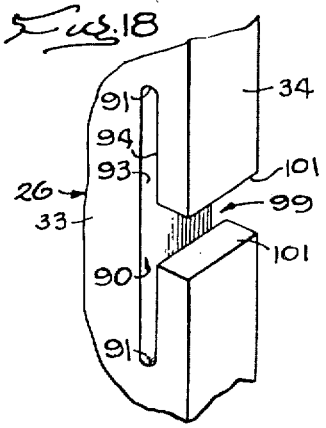
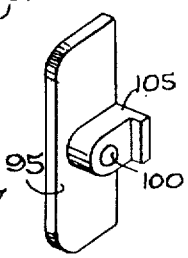
Fig. 17

QUICKLY ATTACHABLE AND DETACHABLE HINGE ASSEMBLY

Matter enclosed in heavy brackets [ ] appears in the original patent but forms no part of this reissue specification; matter printed in italics indicates the additions made by reissue.

BACKGROUND OF THE INVENTION

This invention relates in general to a hardware assembly for connecting two members and, in particular, to a hinge assembly especially adapted for use with cabinets and the like in which one of the members is a frame and the other member is a swingable door. More specifically, the invention relates to a hinge assembly of the type which is readily attachable to and detachable from at least one of the members, such as the door member, to facilitate installation of the hinge assembly or to permit replacement of the door with another of a different style or color. A hinge assembly of this general character is disclosed in U.S. Pat. No. 2,972,166.

SUMMARY OF THE INVENTION

The primary object of the present invention is to provide a new and improved hardware assembly such as a hinge assembly of the above type which may be attached to and detached from the members much faster and with greater ease than has been possible heretofore.

A further object is to provide an easily detachable hinge assembly capable of being adjusted in a unique and simple manner to different positions on the members to enable proper alignment of the members relative to one another.

Another object is to provide a novel detachable hinge assembly of the foregoing character which is especially suitable for use with substantially solid cabinets and doors made of nonmetallic materials such as wood and plastic.

Still another object is to mount the hinge assembly in a novel manner that avoids any danger of stripping the cabinet and door material with attaching screws.

An additional object of the invention is to provide a hinge assembly which is constructed as a self-contained unit requiring no separate fasteners and the like to effect mounting of the assembly on either one or both of the members.

A further object is to simplify manufacturing procedures and techniques used in preparing the members to receive the hinge assembly.

The invention also resides in the novel construction of the hinge assembly to attain the foregoing objects while, at the same time, providing a hinge assembly which is pleasing in appearance and which is capable of use with several different types of door installations. The invention is further characterized by the unique construction of the door and frame members and in their novel coaction with the hinge assembly to facilitate quick and easy attachment and detachment of the assembly.

Other objects and advantages of the invention will become apparent from the following detailed description taken in conjunction with the accompanying drawings.

BRIEF DESCRIPTION OF THE DRAWINGS

FIG. 13 is a view similar to FIG. 12 but showing another embodiment of the hinge assembly, the view being taken substantially along the line 13—13 of FIG. 14.

FIG. 14 is a fragmentary front elevation of the cabinet, door and hinge assembly shown in FIG. 13.

FIG. 15 is a fragmentary perspective view of the hinge assembly and cabinet shown in FIG. 13.

FIG. 16 is a fragmentary perspective view of the hinge assembly and door shown in FIG. 13.

FIG. 17 is a perspective view of a part shown in FIG. 16.

FIG. 18 is a perspective view of part of the cabinet shown in FIGS. 13 to 15.

DESCRIPTION OF THE PREFERRED EMBODIMENTS

Figure 1:
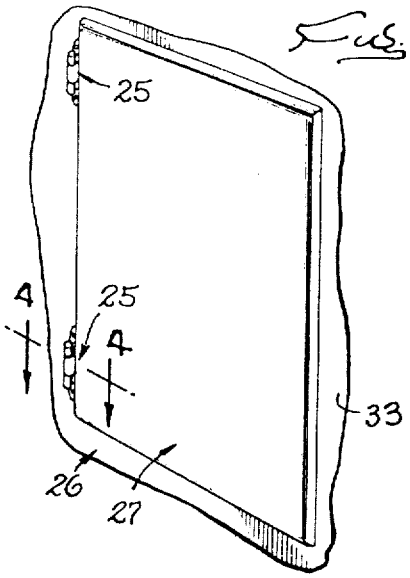
FIG. 1 is a fragmentary perspective view of a cabinet equipped with new and improved hinge assemblies embodying the novel features of the present invention and showing the cabinet door in a closed position.
Figure 2:
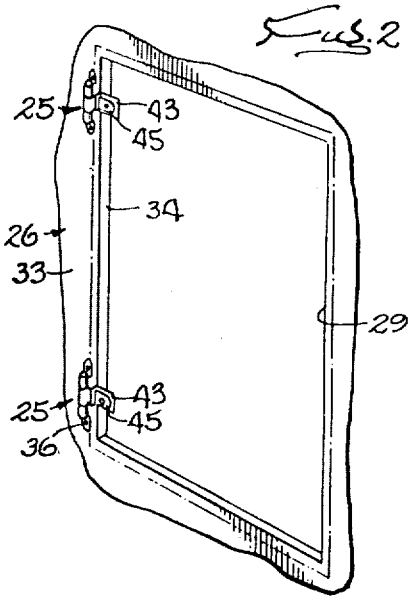
FIG. 2 is a fragmentary perspective view similar to FIG. 1 but showing the door detached from the hinge assemblies.

As shown in the drawings, the invention is embodied in a hinge assembly 25 for pivotally connecting two relatively swingable members which, for purposes of illustration, are shown herein as a cabinet frame member 26 and a door member 27, the latter being swingable between positions covering and uncovering a rectangular access opening 29 (FIG. 2) formed in the front of the cabinet member. In this instance, the door 27 is mounted on the cabinet 26 by a pair of the hinge assemblies 25 which are attached in vertically spaced relation to one edge portion of the door and the adjacent edge portion of the cabinet. The edge portion of the door is defined in part by a rear face surface 30 (FIGS. 4 and 5) and by a generally perpendicular edge surface 31 while the edge portion of the cabinet is defined in part by a forward face surface 33 (FIG. 4) and by a generally perpendicular edge surface 34, the two edge surfaces 31 and 34 lying in generally parallel planes in the closed position of the door. As used herein and in the appended claims, the terms "generally perpendicular" are intended to encompass two surfaces which are mutually angulated in the sense of being approximately perpendicular and are not meant to be limited necessarily to two surfaces disposed at exact right angles to one another.

In its primary aspect, the present invention contemplates a new and improved hinge assembly which, when compared with prior hinges of the same general type, is capable of easier, faster and simpler attachment to and detachment from the door member 27, the cabinet member 26, or both in order to facilitate initial installation of the hinge assembly and to enable convenient removal of the assembly and the door for different advantageous purposes. Moreover, the hinge assembly of the invention is particularly useful with cabinets and doors made of wood, pressed board, plastic and other substantially solid nonmetallic materials and is constructed in a unique manner to avoid the danger of damaging the material as an incident to installation or removal of the hinge.

Stated generally, the foregoing ends are achieved by forming the hinge assembly with at least one retaining wing which is fitted into a specially designed slot formed in one of the surfaces of one of the members 26, 27. An opening in the other surface of the member communicates with the slot and receives a threaded bolt which serves to anchor the retaining wing in the slot thereby to fasten the hinge assembly to the member. Simply by tightening and loosening the bolt, the hinge assembly may be clamped to and unclamped from the member to enable quick and easy attachment and detachment of the assembly. With the retaining wing located in the slot and anchoring the bolt, the wing is hidden from view and does away with the need of attaching the assembly with wood screws or other similar fasteners of the type which are threaded into the material of the member and which can cause stripping of relatively soft, nonmetallic material.

The embodiment illustrated in FIGS. 1 to 8 demonstrates the application of the invention to the preferred form of a semidetachable hinge assembly 25 for an overlay-type wooden cabinet door 27 which is mounted with its face surface 30 spaced forwardly from and disposed in opposing relation with the face surface 33 of the cabinet 26. In this case, the hinge assembly includes a standard mounting wing 35 (FIG. 3) stamped from sheet metal and fastened to the face surface 33 of the cabinet by a pair of regular wood screws 36 threaded into the cabinet. A flange 37 bent outwardly from the mounting wing is formed along its free edge portion with a pair of inwardly curled knuckles 39 which are spaced vertically from one another so as to interfit on opposite sides of a similar knuckle 40 formed at the edge portion of a second flange 41. The latter is disposed in front of the face surface 33 of the cabinet in abutting relation with the edge surface 31 of the door and is formed integrally with a door mounting wing 43 positioned alongside and lying against the face surface 30 of the door. A cylindrical hinge pin 44 extending through the knuckles 39 and 40 connects the two mounting wings together for swinging of the door and the wing 43 relative to the cabinet and the wing 35, the pin being staked at its ends and attached permanently to the hinge assembly.

Figure 4:
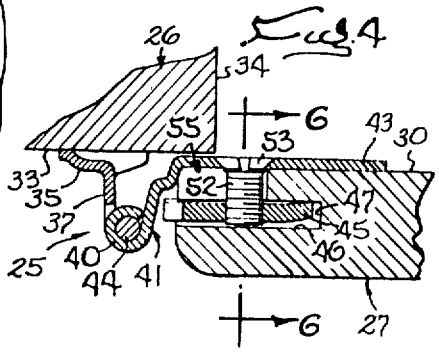
FIG. 4 is an enlarged fragmentary cross section taken substantially along the line 4—4 of FIG. 1.
Figure 19:
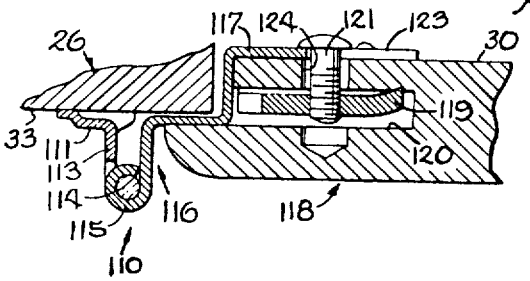
FIG. 19 is a view similar to FIG. 13 but showing still another embodiment of the hinge assembly.
Figure 20:
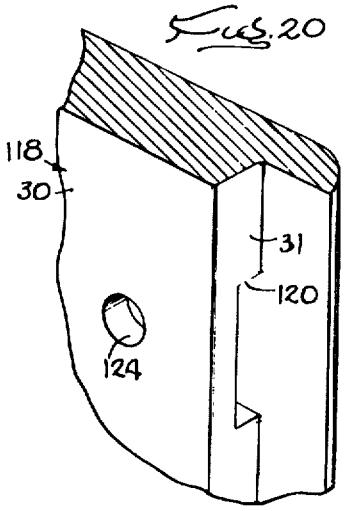
FIG. 20 is a perspective view of part of the door shown in FIG. 19.
Figure 21:
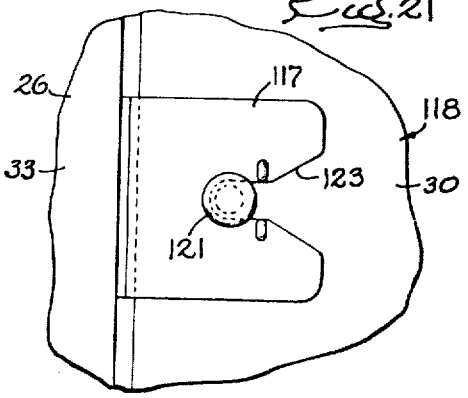
FIG. 21 is a fragmentary rear elevation of the hinge assembly and door shown in FIG. 19.
Figure 22:
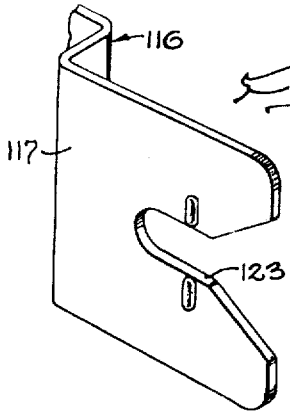
FIG. 22 is a perspective view of part of the hinge assembly shown in FIGS. 19 and 21.
Figure 5:
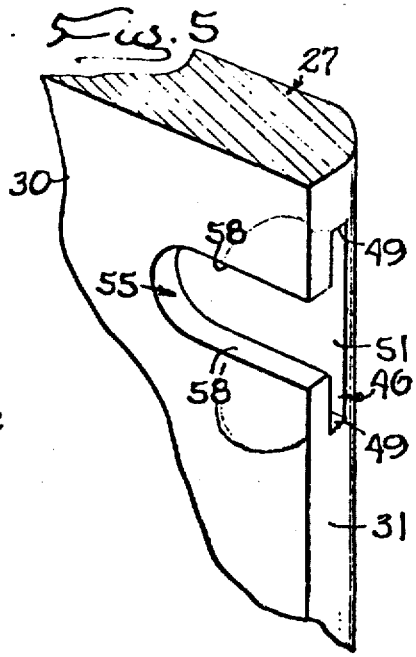
FIG. 5 is an enlarged perspective view of part of the door shown in FIG. 4.
Figure 6:
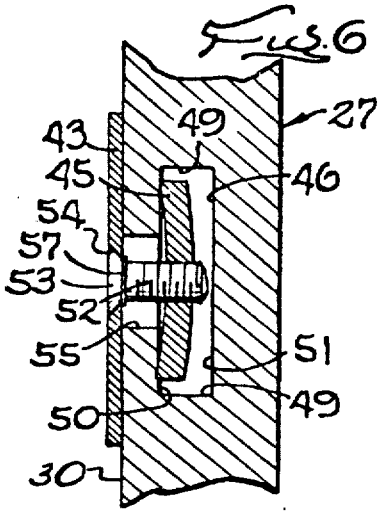
FIG. 6 is a fragmentary cross section taken substantially along the line 6—6 of FIG. 4.
Figure 7:
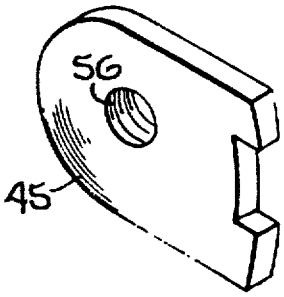
FIG. 7 is an enlarged perspective view of a part shown in FIG. 6.

In the embodiment of the hinge assembly shown in FIGS. 1 to 8, the aforementioned retaining wing is in the form of a disclike washer or retainer 45 (FIGS. 3,4 and 7) which parallels the mounting wing 43 and which is fitted edgewise into a narrow retainer slot 46 (FIGS. 3 and 5) opening out of the edge surface 31 of the door 27. The retainer slot is generally rectangular in cross section and is defined by a closed wall 47 (FIG. 4), upper and lower end walls 49 (FIG. 6) and closely spaced opposing sidewalls 50 and 51, the sidewalls extending generally parallel to the face surface 30 of the door. As shown in FIG. 6, the retainer 45 fits into the slot in closely spaced relation with the sidewalls 50, 51 and is restricted against turning within the slot by the end walls 49. In addition, the edge of the retainer 45 adjacent the flange 41 is engageable with the latter to restrict turning of the retainer and to keep the retainer oriented in the same general angular position shown in FIG. 3.

To connect the mounting wing 43 to the door 27 and the retainer 45, a bolt 52 with a flat head 53 extends first through an opening or hole 54 (FIG. 6) in the mounting wing, then through an opening 55 formed in the face surface 30 of the door, and finally is screwed into a threaded hole 56 (FIG. 7) formed through the central portion of the retainer. Herein, the opening 55 (see FIG. 5) in the face surface 30 is in the form of an elongated slot extending through part of the sidewall 50 into communication with the retaining slot 46 and is defined in part by upper and lower walls 58 and by an open end which opens out of the edge surface 31 of the door so that the bolt may be inserted into the slot 55 from the edge surface 31. The walls 58 extend in the same direction as the end walls 49 of the slot 46 and are spaced apart a distance less than the spacing between the end walls.

Figure 3:
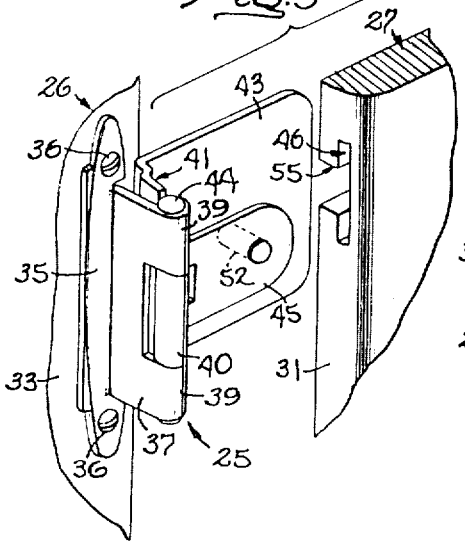
FIG. 3 is a perspective view showing one hinge assembly and parts of the cabinet and the door just before the door is attached to the assembly.

With the foregoing arrangement, the hinge assembly 25 may be installed by first fastening the cabinet mounting wing 35 to the cabinet 26 with the screws 36, the retainer 45 being held attached to the door mounting wing 43 by the bolt 52 as shown in FIG. 3. To attach the door 27, the latter simply is moved edgewise toward the hinge assembly to position the door mounting wing 43 alongside the face surface 30 of the door and to cause insertion of the retainer 45 into the retainer slot 46 through the open end thereof. With the edge of the retainer being engageable with the flange 41, the retainer is kept angularly oriented relative to the slot and need not be manually turned into angular alignment with the slot prior to being inserted into the latter. As an incident to insertion of the retainer into the retainer slot, the bolt, in effect, passes into the open end of the elongated slot 55 and assumes a position spaced from the open end as shown in FIG. 4. Thereafter, the bolt is simply given a slight turn in a tightening direction to clamp the door mounting wing 43 firmly to the face surface 30 of the door and to draw the retainer into tight engagement with the sidewall 50 of the retainer slot 51 thereby to clamp the door between the wing and the retainer and to attach the door securely to the hinge assembly. Preferably, the retainer 45 is crowned or bowed slightly from its center toward its edges as shown in FIG. 6 to cause the edges to dig into the wood of the sidewall 50 and thus effect a tighter clamp against the door. If it is desired to remove the door, it is necessary only to loosen the bolt slightly to unclamp the mounting wing 43 and the retainer 45 from the door. The door then may be moved edgewise away from the hinge assembly with the latter remaining attached to the cabinet.

Because of the ease and rapidity with which the door 27 may be attached to and detached from the hinge assembly 25, the door need not be attached to the cabinet 26 at the manufacturing plant but, instead, can be attached easily by a distributor, a dealer, an installer or even the ultimate user. As a result, the doors may be shipped separate from the cabinets and without any attached hinge hardware thus resulting in less damage in transit to both the doors and the cabinets. Moreover, the easily detachable hinge assembly makes it feasible for a distributor or dealer to stock a basic line of cabinets and to apply doors with a style and color of the customer's choosing thus reducing the amount of cabinet inventory required to carry a full line of cabinet designs. Since there is little danger of marking or scratching the finish on the door when the hinge assembly is installed, the doors can be finished with the assembly detached thus avoiding finishing voids beneath the hinge assembly. Also, the hinge assembly may be attached and detached any number of times without any possibility of the door material being stripped by threaded wood screws since the bolt 52, instead of being screwed into the wood, is threaded into the retainer 45 concealed within the slot 46.

To advantage, provision is made for adjusting the door 27 through wide ranges, both vertically and laterally, relative to the hinge assembly 25 to permit fast and easy alignment of the door into a correct position with respect to the cabinet opening 29 in case the cabinet mounting wing 35 is improperly positioned on the cabinet 26 or in case the cabinet is "racked" or out of square. To these ends, the retainer slot 46 and the elongated slot 55 are made slightly larger than the retainer 45 and the bolt 52, respectively, to allow limited floating of the retainer and the bolt within the slots to the positions necessary to permit proper alignment of the door. Once the door has been aligned and the bolt tightened, the retainer and the mounting wing are clamped rigidly to the door to hold the latter in its adjusted position.

More specifically and as shown in FIG. 6, the spacing between the end walls 49 of the retainer slot 46 is approximately one-eighth inch greater than the spacing between the corresponding edges of the retainer 45 and, in addition, the spacing between the walls 58 of the elongated slot 55 is at least one-eighth inch greater than the diameter of the bolt. As a result, before the bolt is tightened, the door 27 may be shifted vertically relative to the bolt and the retainer to enable accurate positioning of the upper and lower edges of the door relative to the corresponding edges of the cabinet opening 29. Moreover, the depth of the retainer slot 46 (i.e., the horizontal distance between the closed wall 47 and the open end of the slot) is approximately one-fourth inch greater than the horizontal dimension of the retainer and this, in conjunction with the elongated open-ended slot 55 for receiving the bolt 52, enables location of the door in various lateral positions with respect to the hinge assembly while still permitting clamping of the door to the assembly. With the door being laterally and vertically adjustable on the hinge assembly, the door can be fitted properly to the cabinet even though the cabinet mounting wing 35 is improperly placed on the cabinet and even though the cabinet is in a racked condition.

It should be noted that the provision of the slots 46 and 55 eliminates the need of gang drilling the door 27 to receive threaded wood screws. The slots can be cut into the door simultaneously with a simple routing operation and by employing an inexpensive routing tool and, since the slots are larger than the retainer 46 and the bolt 52, the position of the routing is not extremely critical and can be off by as much as one-sixteenth inch without affecting installation of the door to the hinge assembly.

Figure 8:
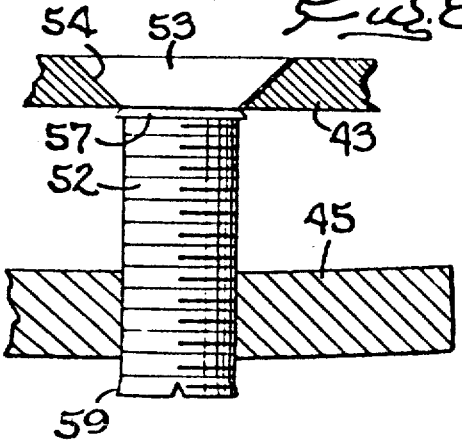
FIG. 8 is an enlarged fragmentary elevation of parts illustrated in FIG. 6 and showing a bolt which is used for mounting the hinge assembly.

Means are provided for preventing withdrawal of the bolt 52 from the hole 54 in the door mounting wing 43 so as to hold the bolt and the wing together as a unitary assembly and also to keep the retainer 45 spaced from the wing prior to installation of the hinge so that the retainer need not be pulled away from the wing and into alignment with the slot 46 when the hinge is installed. Herein, this means comprises an enlarged annular captivating collar 57 formed around the shank of the bolt and, as viewed in FIG. 8, is located just below the mounting wing 43 and the head 53 of the bolt. The collar is formed at the factory with a suitable die after the bolt first has been inserted through the hole 54. The collar is larger than the hole 54 and keeps the bolt from being withdrawn from the hole while still permitting turning of the bolt. As a result of the captivating collar, the bolt and the door mounting wing 43 are held permanently together to prevent loss of the bolt and to avoid the need of inserting the bolt into the hole when the door 27 is attached to the hinge assembly 25. In addition, the bolt cannot slip outwardly of the hole to pull the retainer toward the wing. As a result, the retainer is automatically held in spaced apart relation with the wing during insertion of the retainer into the slot 46.

Preferably, the bolt 52 also is restricted from being withdrawn from the hole 56 in the retainer 45 so that the retainer is held permanently to the bolt and the door mounting wing 43 thus enabling shipment and installation of the hinge assembly 25 as a self-contained unit. For this purpose, the metal at the end of the bolt opposite the head 53 is deformed and spread, as indicated at 59 in FIG. 8, with an appropriate tool at the factory after the retainer first has been threaded onto the bolt. Thereafter, the retainer cannot be unthreaded from the bolt and, as a result, the door mounting wing 43, the bolt, and the retainer are held together as a unitary assembly to simplify the packaging and marketing of the hinge and to do away with the need of threading the bolt into the retainer when the door is attached. Thus, the installer of the door may receive the hinge as a unit, needs only to tighten the bolt to clamp the door, and is not required to insert the bolt into the hole 54 in the mounting wing 43 or to thread the bolt into the hole 56 in the retainer 45.

Figure 9:
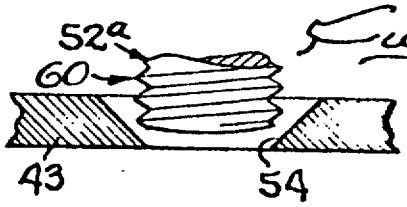
FIG. 9 is a view somewhat similar to FIG. 8 but showing a modified form of bolt.
Figure 10:
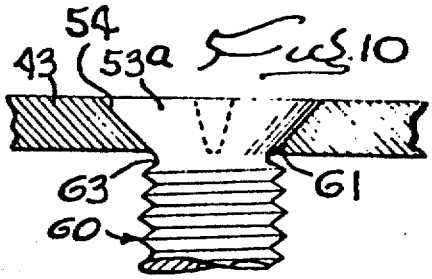
FIG. 10 is a view similar to FIG. 9 but showing the modified bolt in a different position.

As an alternative to using the collar 57 for captivating the bolt 52 in the door mounting wing 43, a specially formed self-tapping bolt 52a may be used. As shown in FIGS. 9 and 10, the bolt 52a is formed with self-tapping threads 60 which are somewhat larger in diameter than the hole 54 in the door mounting wing. To insert the bolt into the hole, the bolt is turned in a tightening direction and, as an incident to such turning, the threads 60 cut away and tap through the material defining the edges of the hole thereby to form a thread 61 (FIG. 10) at the hole edges. The portion of the bolt shank just below the bolt head 53a (as viewed in FIG. 10) is reduced in diameter or necked down as indicated at 63. Thus, once the uppermost turn of the thread on the bolt has been threaded past the edges of the hole 54, the bolt will simply turn in the hole with the necked down portion 63 turning adjacent the hole edges, and the bolt will not back out of the hole. This is a somewhat simpler way of captivating the bolt than through the formation of the collar, but is not quite as reliable since it is possible, by withdrawing the bolt bodily through a slight distance, to bring the uppermost turn of the bolt thread into mating engagement with the hole edges and thereafter to unthread the bolt from the hole.

Figure 11:
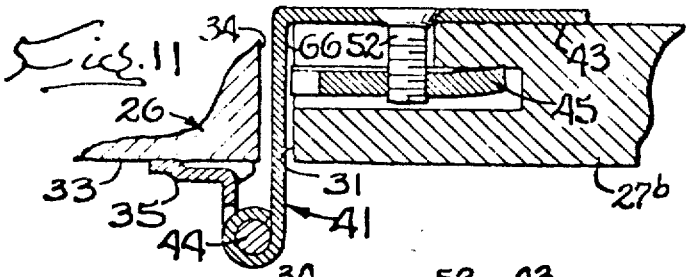
FIG. 11 is a view similar to FIG. 4 but showing a slightly modified hinge assembly used in conjunction with a different type of door.
Figure 12:
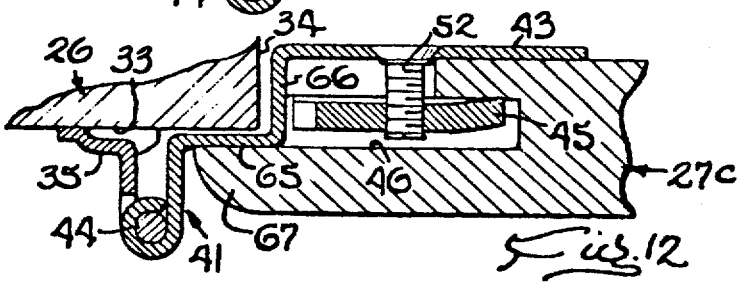
FIG. 12 is a view similar to FIG. 11 but showing the modified hinge assembly used in conjunction with still another type of door.

Since the retainer 45 is concealed within the slot 46 and since the door mounting wing 43 is hidden behind the door 27, the hinge assembly 25 is relatively attractive in appearance when used in conjunction with an overlay-type door. With slight modifications, the assembly may be used to equal advantage with other types of doors such as, for example, a flush or fully inset door 27b as shown in FIG. 11 in which the edge surface 31 of the door opposes the edge surface 34 of the cabinet 26. To adapt the hinge assembly for attachment to the inset door, the flange 41 is simply lengthened and is placed between the edge surfaces 31 and 34 of the door and the cabinet. The hinge assembly also may be applied to a partially inset door 27c (see FIG. 12) which includes a projecting lip 67 extending along and opposing the face surface 33 of the cabinet. In this instance, the flange 41 is formed with two right-angled bent portions 65 and 66, the former lying along the face surface 33 of the cabinet and the latter being sandwiched between the lip and the face surface of the cabinet and being hidden from view.

Within its general principles, the invention further contemplates a fully demountable hinge assembly 70 (FIGS. 13 to 18) which not only is easily attachable to and detachable from the door 27c as before but which also may be attached to and detached from the cabinet 26 with equal ease. For this purpose, the hinge assembly 70 is mounted on both the door and the cabinet in essentially the same manner that the hinge assembly 25 is mounted on the door. Accordingly, the hinge assembly 70 may be attached to and detached from the cabinet as quickly and as easily as it may be applied to and removed from the door.

More particularly and as shown in FIGS. 13 and 15, the parts of the hinge assembly 70 applied to the door 27c are substantially identical to those of the hinge assembly 25 of the first embodiment. That is, the hinge assembly 70 includes a flange 71 with a knuckle 73 and right-angled bent portions 74 and 75, a door mounting wing 76 formed integrally with the flange and positioned along the face surface 30 of the door, and a retaining wing or retainer 77 fitted into and adjustable within the retaining slot 46 cut into the edge surface 31 of the door. One edge (the left edge as viewed in FIG. 15) of the retainer is engageable with the flange portion 75 to keep the retainer positioned substantially in the same angular position shown in FIG. 15. A bolt 79 extends through and is adjustable within the opening or elongated slot 55 in the face surface 30 of the door and is threaded into the retainer, the bolt being captivated within the door mounting wing 76 by a collar 80 (FIG. 13) and being formed with a deformed end portion 81 preventing withdrawal of the bolt from the retainer. As before, the door may be attached to the hinge assembly simply by moving the door edgewise until the retainer 77 and the bolt 79 are inserted into the slots 46 and 55, respectively, and thereafter by turning the bolt through a slight distance in a tightening direction to clamp the retainer and the door mounting wing 76 to the door.

For purposes of attaching the hinge assembly 70 to the cabinet 26, the assembly includes a cabinet mounting wing 83 (FIGS. 13, 15 and 16) positioned alongside the edge surface 34 of the cabinet and formed with two bent flanges 84 and 85. The first flange 84 extends along the face surface 33 of the cabinet and is formed with a rectangular opening 86 (FIG. 15) which receives the bent portion 74 of the door wing flange 71 in the closed position of the door 27c. Upper and lower curled knuckles 87 formed on the free edge portion of the second flange 85 interfit with the knuckle 73 and receive a hinge pin 89 which swingably connects the wings 76 and 83.

As shown in FIGS. 13 and 18, a slot 90 is formed in the face surface 33 of the cabinet 26 and is defined by upper and lower end walls 91 (FIG. 18) and closely spaced sidewalls 93 and 94 extending parallel to the edge surface 34 of the cabinet. A retaining wing or retainer 95 (FIGS. 13, 16 and 17) is insertable into the slot 90 from the face surface 33 and is sized to fit loosely in the slot for limited floating while being restricted against turning both by the slot and by engagement of the retainer with the flange 84. The cabinet wing 83 and the retainer 95 extend generally parallel to each other and are connected by a threaded bolt 96 (FIGS. 13 and 16) extending first through a hole 97 (FIG. 16) in the cabinet wing 83, then through an opening 99 (FIG. 18) in the edge surface 34 of the cabinet, and finally screwed into a threaded hole 100 (FIG. 17) in the retainer 95. Herein, the opening 99 (see FIG. 18) also is in the form of an elongated slot communicating with the retaining slot 90 and having an open end opening out of the face surface 33 of the cabinet. The elongated slot 99 is defined by upper and lower walls 101 (FIG. 18) which are spaced apart a distance somewhat greater than the diameter of the bolt 96 to permit floating of the latter for purposes of adjusting the hinge assembly 70. As before, the bolt is prevented from being withdrawn from the hole 97 in the cabinet wing 83 by a collar 103 (FIG. 16), and is deformed at its end as indicated at 104 in FIG. 16 to restrict its withdrawal from the hole 100 in the retainer 95. In this instance, the hole 100 is formed through an enlarged boss 105 (FIG. 17) which is formed integrally with the retainer and which, in the installed position of the hinge assembly, is located in the elongated slot 99 to help fill up the latter and improve the appearance of the cabinet when the door 27c is open.

To attach the hinge assembly 70 to the cabinet 26, the assembly is simply moved rearwardly toward the face surface 33 of the cabinet to insert the retainer 95 into the retainer slot 90 and to position the mounting wing 83 alongside the edge surface 34. As the retainer is inserted into the slot 95, the bolt 96 and the boss 105 move into the elongated slot 99 to the positions shown in FIG. 13. After the assembly has been adjusted to a proper position by shifting the retainer 95 within the slot 90, the bolt 96 is tightened to clamp the mounting wing 83 and the retainer 95 to the cabinet. The door 27c then may be attached to the mounting wing 76 and the retainer 77 in the manner described previously in conjunction with the hinge assembly 25. Simply by loosening each of the bolts 79 and 96 through a slight turn, the entire hinge assembly 70 may be detached from both the cabinet and the door.

From the foregoing, it will be apparent that the fully detachable hinge assembly 70 embodies all of the advantages of the semidetachable hinge assembly 25 and, in addition, is quickly and easily attachable to and detachable from the cabinet as well as the door. This enables shipment of both the cabinet and the door without any hinge hardware thus reducing the danger of damage to the cabinet and the door. With the bolts 79 and 96 held captive with the retainers 77 and 95 and the wings 76 and 83, the hinge assembly may be packaged, sold and installed as a self-contained unit requiring no separate screws or other fasteners.

A modified form of semidetachable hinge assembly 110 embodying some of the features of the invention is shown in FIGS. 19 to 22. In this instance, the hinge assembly includes a standard cabinet mounting wing 111 (FIG. 19) fastened to the face surface 33 of the cabinet 26 by wood screws (not visible) and formed with a flange 113 with a pair of curled knuckles (not visible) for receiving a hinge pin 114. The latter also extends through an interfitting knuckle 115 curled from the free edge portion of a flange 116 formed integrally with a door mounting wing 117 positioned along the face surface 30 of a door 118. A retaining wing or retainer 119 is fitted adjustably into an enlarged slot 120 formed in the edge surface 31 of the door and receives a threaded bolt 121 which extends through an opening 123 (FIG. 22) in the door mounting wing and an opening 124 (FIGS. 19 and 20) in the face surface 30 of the door. In this instance, the opening 123 in the mounting wing 117 is a slot having an open end opening out of one edge of the wing. The opening 124 in the face surface 30 is a circular hole communicating with the retaining slot 120 and formed with a diameter somewhat larger than that of the bolt 121 to allow limited floating of the bolt.

When the hinge assembly 110 is used by a cabinet manufacturer, the door 118 usually will be shipped with the retainer 119 having been previously inserted into the slot 120 and held loosely in place by the bolt 121. After fastening the cabinet mounting wing 111 to the cabinet 26, the cabinet dealer or installer then may attach the door simply by moving the door edgewise toward the hinge assembly to slip the bolt into the open end of the slot 123 in the door mounting wing 117. Once the door has been adjusted to the proper position, the bolt may be tightened to clamp the door mounting wing 117 and the retainer 119 to the door and thereby complete the installation. The retainer is engageable with the flange 116 and thus is restricted against turning when the bolt is tightened. Quick removal of the door may be effected by loosening the bolt slightly and shifting the door edgewise away from the hinge assembly to slip the bolt out of the slot 123 through the open end thereof.

From the foregoing, it will be apparent that the hinge assembly 110 may be attached and detached as quickly and easily as the hinge assembly 25 of the first embodiment. The door 118 may be adjusted vertically and laterally for correct positioning on the cabinet 26 and, in addition, there is no danger of stripping the door material with threaded wood screws. The hinge is, however, concealed to the same extent that would be the case if the mounting wing 117 were attached with such screws. In some respects, the hinge assembly 110 is not as advantageous as the hinge assembly 25 since the hole 124 in the door 118 cannot be formed at the same time as the slot 120 is formed and since the door usually will be shipped with the retainer 119 and the bolt 121 attached to the door thus increasing the chances of damage in transit.

While the principles of the invention have been disclosed specifically in conjunction with hinge assemblies for connecting relatively swingable members, it will be appreciated that the general concept of the invention also is applicable to other types of hardware assemblies used for connecting two members.

I claim as my invention:

[1. A hinge assembly for use in pivotally connecting first and second relatively swingable members with at least the second member having an edge portion defined in part by a first surface formed with an open-ended slot and by a generally perpendicular second surface having an opening communicating with said slot, said hinge assembly comprising first and second wings swingably connected together with the first wing being mountable on said first member and with the second wing having an opening and being positionable along one side of said second surface of said second member with such opening aligned with the opening in the second surface, a retainer insertable into said slot from said first surface for placement in the slot along the other side of said second surface and being restricted against turning within the slot, said retainer having a hole located to be aligned with the opening in said second surface and with the opening in said second wing, and a bolt sized to extend first through said opening in said second wing and then through said opening in said second surface and threaded into said hole in said retainer, said bolt being turnable in one direction to clamp said second wing to said second member and being turnable in the opposite direction to release said second wing from said second member thereby to permit removal of at least part of the hinge assembly from the second member.]

2. A hinge assembly for use in pivotally connecting first and second relatively swingable members with at least the second member having an edge portion defined in part by a [first] *vertical edge* surface formed with an open-ended slot and by a [generally perpendicular second] *flat vertical face* surface *perpendicular to said edge surface and* having an opening communicating with said slot, said hinge assembly comprising first and second wings swingably connected together with the first wing being mountable on said first member and with the second wing having an opening and being positionable along one side of said [second] *face* surface of said second member with such opening aligned with the opening in the [second] *face* surface, a retainer insertable into said slot from said [first] *edge* surface for placement in the slot along the other side of said [second] *face* surface and being restricted against turning within the slot, and a threaded bolt sized to extend through said openings in said [second] *face* surface and said second wing for interconnecting said second wing and said retainer and for clamping said second wing to said second member, said bolt being releasable to permit removal of said second wing from said second member.

3. A hinge assembly for use in pivotally connecting first and second relatively swingable members with at least the second member having an edge portion defined in part by a first surface formed with a first open-ended slot and by a generally perpendicular second surface formed with a second slot communicating with said first slot and opening out of said first surface, said hinge assembly comprising first and second wings swingably connected together with the first wing being mountable on said first member and with the second wing having a hole and being positionable along one side of said second surface of said second member with such hole aligned with said second slot, a retainer insertable into said first slot from said first surface for placement in the first slot along the other side of said second surface and being restricted against turning within the first slot, said retainer having a hole located to be aligned with the second slot and with the hole in said second wing, a bolt extending first through said hole in said second wing and then through said second slot and threaded into said hole in said retainer, said bolt being insertable into said second slot from the open end thereof as an incident to insertion of said retainer into said first slot, said bolt being turnable in one direction to clamp said second wing and said retainer to said second member and being turnable in the opposite direction to release said second wing and said retainer from said second member thereby to permit removal of the hinge assembly from the second member, and means restricting withdrawal of said bolt from the hole in said second wing thereby to hold said bolt and said second wing together as a unitary assembly.

4. A hinge assembly as defined in claim 3 further including means restricting withdrawal of said bolt from the hole in said retainer whereby said second wing, said bolt and said retainer are held together as a unitary assembly.

5. In a hinge assembly, the combination of, first and second hinge wings formed with interfitting knuckles, a hinge pin extending through said knuckles and connecting said wings together for relative swinging, a retainer spaced from and generally facing said second wing, said retainer and said second wing being formed with aligned holes, a bolt extending through said hole in said second wing and threaded into said hole in said retainer, said bolt having a head and being turnable to vary the spacing between said second wing and said retainer, and means on said bolt adjacent the hole in said second wing and captivating the latter against said head to restrict the second wing from sliding relative to the bolt and thereby prevent the spacing between said second wing and said retainer from being changed except by turning the bolt.

[6. A hinge assembly as defined in claim 5 further including means restricting withdrawal of said bolt from the hole in said retainer whereby said second wing, said bolt and said retainer are held together as a unitary assembly.]

[7. In a hinge assembly, the combination of, first and second hinge wings formed with interfitting knuckles, a hinge pin extending through said knuckles and connecting said wings together for relative swinging, a retainer spaced from and generally facing each wing, each wing and each adjacent retainer being formed with aligned holes, threaded bolts extending through the holes in said wings and threaded into the holes in said retainers, said bolts being individually turnable to vary the spacing between said wings and said retainers, and means restricting withdrawal of said bolts from the holes in the wings thereby to hold said bolts and said wings together as a unitary assembly.]

[8. A hinge assembly as defined in claim 7 further including means restricting withdrawal of said bolts from the holes in said retainers whereby said wings, said bolts and said retainers are held together as a unitary assembly.]

9. The combination of, first and second members and a hinge assembly for connecting said members together for relative swinging, said second member being substantially solid and nonmetallic and having an edge portion defined in part by a first surface formed with a slot and by a generally perpendicular second surface, said slot opening out of said first surface and being defined at least in part by opposed end walls and by two closely spaced opposing sidewalls, an opening formed in said second surface and extending through part of one of said sidewalls into communication with said slot, said hinge assembly comprising a first wing and a second retaining wing swingably connected together with the first wing being mounted on said first member and with the retaining wing being inserted into said slot from the open end thereof and being located in closely spaced relation with each of said sidewalls, a threaded bolt extending through said opening and attached at its inner end to said retaining wing, and means larger than said opening located at the outer end of said bolt and selectively engageable with said second surface to clamp said retaining wing against said one wall of said slot thereby to fasten said hinge assembly to said second member, *said slot being slightly larger than said retaining wing and the size of said opening being slightly larger than said bolt to allow limited floating of said second wing in said slot and permit adjustment of said hinge assembly on said second member.*

[10. The combination defined in claim 9 in which said slot is slightly larger than said retaining wing and in which the size of said opening is slightly larger than said bolt to allow limited floating of said second wing in said slot and permit adjustment of said hinge assembly on said second member.]

11. The combination of, first and second members and a hinge assembly for connecting said members together for relative swinging, each of said members having an edge portion defined in part by a first surface formed with a slot and by a generally perpendicular second surface, each of said slots opening out of the first surface of its respective member and being defined in part by two closely spaced opposing sidewalls, an opening formed in the second surface of each member and extending through one of the sidewalls into communication with the slot in the respective member, said hinge assembly comprising first and second retaining wings swingably connected together, each of said wings being inserted into the slot in its respective member and being located in closely spaced relation with the sidewalls of such slot, threaded bolts extending through said openings and each attached at its inner end to the wing in the adjacent slot, and means larger than said openings located at the outer ends of bolts and selectively engageable with the second surfaces of the members to clamp said wings against the walls of said slots thereby to fasten said hinge assembly to said members, *each of said slots being slightly larger than the associated retaining wing and the size of each of said openings being slightly larger than the associated bolt to allow limited floating of said retaining wings in said slots thereby to permit adjustment of said hinge assembly on said members.*

[12. The combination defined in claim 11 in each slot is slightly larger than the associated retaining wing and in which the size of each opening is slightly larger than the associated bolt to allow limited floating of said retaining wings in said slots thereby to permit adjustment of said hinge assembly on said members.]

13. The combination of, first and second members and a hinge assembly for connecting said members together for relative swinging, said second member having an edge portion defined in part by a first surface and by a generally perpendicular second surface, a first slot formed in said second member and opening out of said first surface, said first slot being defined in part by a sidewall, a second slot formed in said second surface and extending through part of said sidewall into communication with said first slot, said second slot having an open end opening out of said first surface, said hinge assembly comprising a first wing and a second retaining wing swingably connected together with said first wing being mounted on said first member, said retaining wing being formed with a threaded hole, a bolt threaded at its inner end into said hole for turning relative to said retaining wing, means restricting withdrawal of said bolt from said hole thereby to hold said bolt and said retaining wing together as a unitary assembly, said retaining wing being insertable into said first slot through the open end thereof and being positioned in the first slot, and said bolt being insertable into said second slot through the open end thereof as an incident to insertion of said retaining wing and being positioned in said second slot, and means at the outer end of said bolt selectively engageable with said second surface to cause clamping of said retaining wing against said wall of said first slot thereby to fasten said hinge assembly to said second member.

14. The combination of, first and second members and a hinge assembly for connecting said members together for relative swinging, said second member having an edge portion defined in part by a first surface and by a generally perpendicular second surface, a first slot formed in said second member and opening out of said first surface, said first slot being of predetermined size and being defined in part by two end walls spaced apart a predetermined distance and by two opposed sidewalls, a second slot formed in said second surface and extending through part of one of said sidewalls into communication with said first slot, said second slot having an open end opening out of said first surface and being defined in part by edges extending substantially in the same direction as said end walls and spaced apart a distance less than the spacing between said end walls, said hinge assembly comprising first and second hinge wings formed with interfitting knuckles, a hinge pin extending through said knuckles and connecting said wings together for relative swinging, said first wing being attached to said first member, said second wing having a hole and being positioned along one side of said second surface of said second member with such hole aligned with said second slot, a retainer insertable into said first slot through the open end thereof and positioned in said first slot, said retainer being smaller in size than said first slot and being capable of floating through a limited range within said first slot, said retainer having a hole aligned with said second slot and with said hole in said second wing, a threaded bolt smaller than said second slot extending through said hole in said second wing and through said second slot and threaded into said hole in said retainer, said bolt being insertable into said second slot through the open end thereof as an incident to insertion of said retainer into said first slot and being smaller in size than said second slot so as to be capable of floating through a limited range within said second slot, said bolt being turnable in one direction to clamp said second wing to said second surface and to clamp said retainer to said one wall and being turnable to the opposite direction to release said second wing and said retainer thereby to permit removal of the hinge assembly from the second member, and means restricting withdrawal of said bolt from the hole in said second wing thereby to hold said bolt and said second wing together as a unit when said hinge assembly is removed.

[15. The combination of, a cabinet having a frame member and having a door member, and a hinge assembly connecting said door member to said frame member for swinging between open and closed positions, said members each having a face surface and a generally perpendicular edge surface with the edge surfaces of the two members residing in generally parallel planes in the closed position of said door member, first slots formed in the edge surface of said door member and in the face surface of said frame member with each slot opening out of its respective surface, second slots formed in the face surface of said door member and in the edge surface of said frame member with each second slot communicating with the first slot in the respective member, the second slot in said door member having an open end opening out of the edge surface of the door member, and the second slot in the frame member having an open end opening out of the face surface of the frame member, said hinge assembly comprising frame and door wings formed with interfitting knuckles, a hinge pin extending through said knuckles and connecting said wings together for swinging of said door wing relative to said frame wing, said door wing being positioned alongside said face surface of said door member and having a hole aligned with the second slot in said door member, said frame wing being positioned alongside said edge surface of said frame member and having a hole aligned with the second slot in said frame member, door and frame retainers positioned in the first slots of the respective members with each retainer being insertable into its respective slot through the open end thereof, each retainer having a hole aligned with the second slot in the respective member and with the hole in the respective wing, and bolts extending through the holes in said wings and through said second slots and threaded into the holes in said retainers, said bolts being insertable into said second slots through the open ends thereof as an incident to insertion of said retainers into said first slots, and said bolts being turnable in one direction to clamp said wings and said retainers to the respective members and being turnable in the opposite direction to release the wings and the retainers from the members thereby to permit removal of the entire hinge assembly from the members.]

16. The combination of, first and second members and a hinge assembly for connecting said members together for relative swinging, said second member being substantially solid and nonmetallic and having an edge portion defined in part by a first surface formed with a slot and by a generally perpendicular second surface, said slot opening out of said first surface and being defined at least in part by opposed end walls and by two closely spaced opposing sidewalls, a circular hole formed in said second surface and extending through part of one said sidewalls into communication with said slot, said hinge assembly comprising first and second wings formed with interfitting knuckles, a hinge pin extending through said knuckles and connecting said wings together for relative swinging, said first wing being mounted on said first member and said second wing being positioned alongside said second surface of said second member and having an opening aligned with said hole, a retainer insertable into said slot from the open end thereof and being located in closely spaced relation with said sidewalls, said retainer having a hole aligned with said hole in said second surface and with said opening in said second wing, a threaded bolt extending through said opening in said second wing and through said hole in said second surface and threaded at its inner end into said hole in said retainer, said bolt having a head on its outer end and being turnable in one direction to clamp said head against said second wing thereby to clamp the latter against said second surface and turnable in the opposite direction to unclamp said head from said second wing, and said opening in said second wing being shaped to slip past the head of said bolt and permit removal of said second wing from said second member when said bolt is turned sufficiently to unclamp said head but remains threaded into said retainer, *said slot being slightly larger than said retainer and said circular hole in said second surface being slightly larger in diameter than said bolt to allow limited floating of said retainer in said slot and thereby permit adjustment of said hinge assembly on said second member.*

[17. The combination as defined in claim 16 in which said slot is slightly larger than said retainer and in which said circular hole in said second surface is slightly larger in diameter than said bolt to allow limited floating of said retainer in said slot and thereby permit adjustment of said hinge assembly on said second member.]

[18. Hardware assembly for use in connecting first and second members with at least the second member having an edge portion defined in part by a first surface formed with an open-ended slot and by a generally perpendicular second surface having an opening communicating with said slot, said hardware assembly comprising first and second parts connected together with the first part being mountable on said first member and with the second part having an opening and being positionable along one side of said second surface of said second member with such opening aligned with the opening in the second surface, a retainer insertable into said slot from said first surface for placement in the slot along the other side of said second surface and being restricted against turning within the slot, said retainer having a hole located to be aligned with the opening in said second surface and with the opening in said second part, and a bolt sized to extend first through said opening in said second part and then through said opening in said second surface and threaded into said hole in said retainer, said bolt being turnable in one direction to clamp said second part to said second member and being turnable in the opposite direction to release said second part from said second member thereby to permit removal of at least part of the hardware assembly from the second member.]

[19. A hardware assembly comprising first and second interconnected plates, a retainer spaced from and generally facing each plate, each plate and each adjacent retainer being formed with aligned holes, threaded bolts extending through the holes in said plates and threaded into the holes in said retainers, said bolts being individually turnable to vary the spacing between said plates and said retainers, and means restricting withdrawal of said bolts from the holes in the plates thereby to hold said bolts and said plates together as a unitary assembly.]

[20. A hardware assembly as defined in claim 19 further including means restricting withdrawal of said bolts from the holes in said retainers whereby said plates, said bolts and said retainers are held together as a unitary assembly.]

21. A hinge assembly as defined in claim 2 further including coacting surfaces on said second wing and said retainer and engageable with one another to limit turning of said retainer when said bolt is turned and to maintain said retainer in a substantially fixed angular position relative to said slot.

22. A hinge assembly as defined in claim 3 further including coacting surfaces on said second wing and said retainer and engageable with one another to limit turning of said retainer when said bolt is turned and to maintain said retainer in a substantially fixed angular position relative to said first slot.

23. [Hardware assembly as defined in claim 18 further including] *Hardware assembly for use in connecting first and second members with at least the second member having an edge portion defined in part by a first surface formed with an open-ended slot and by a generally perpendicular second surface having an opening communicating with said slot, said hardware assembly comprising first and second parts connected together with the first part being mountable on said first member and with the second part having an opening and being positionable along one side of said second surface of said second member with such opening aligned with the opening in the second surface, a retainer insertable into said slot from said first surface for placement in the slot along the other side of said second surface and being restricted against turning within the slot, said retainer having a hole located to be aligned with the opening in said second surface and with the opening in said second part, and a bolt sized to extend first through said opening in said second part and then through said opening in said second surface and threaded into said hole in said retainer, said bolt being turnable in one direction to clamp said second part to said second member and being turnable in the opposite direction to release said second part from said second member thereby to permit removal of at least part of the hardware assembly from the second member, and* means on said second part and said retainer to limit turning of said retainer when said bolt is turned and to maintain said retainer in a substantially fixed angular position relative to said slot.

24. Hardware assembly as defined in claim 23 further including means on said bolt between said retainer and said second part and engageable with the latter to restrict endwise withdrawal movement of said bolt from said opening in said second part thereby to hold the latter and the bolt together as a unitary assembly and to keep the spacing between said second part and said retainer from being changed as a result of endwise movement of said bolt.

[25. The combination of, first and second members and a hardware assembly for connecting said members together, said second member being substantially solid and nonmetallic and having an edge portion defined in part by a first surface formed with a slot and by a generally perpendicular second surface, said slot opening out of said first surface and being defined at least in part by opposed end walls and by two closely spaced opposing sidewalls, an opening formed in said second surface and extending through part of one of said sidewalls into communication with said slot, said hardware assembly comprising a first wing and a second retaining wing joined together with the first wing being mounted on said first member and with the retaining wing being inserted into said slot from the open end thereof and being located in closely spaced relation with each of said sidewalls, a threaded bolt attached at its inner end to said retaining wing and extending outwardly away from said opening, and means larger than said opening located at the outer end of said bolt and selectively engageable with said second surface to clamp said retaining wing against said one wall of said slot thereby to fasten said hardware assembly to said second member.]

[26. A hardware assembly comprising first and second members joined together and each having a plate, a retainer spaced from and generally facing each plate, each plate and each adjacent retainer being formed with aligned holes, threaded bolts extending through the holes in said plates and threaded into the holes in said retainers, said bolts being individually turnable to vary the spacing between said plates and said retainers, and coacting surfaces on said retainers and said members engageable with one another to limit turning of said retainers when said bolts are turned and to maintain said retainers in substantially fixed angular positions relative to said plates.]

[27. Hardware assembly as defined in claim 26 further including means on said bolts restricting endwise withdrawal of the latter from the holes in said plates thereby to prevent the spacing between said plates and said retainers from being changed except by turning said bolts.]

28. In a hinge assembly, the combination of, first and second hinge wings formed with interfitting knuckles, a hinge pin extending through said knuckles and connecting said wings together for relative swinging, a retainer spaced from and generally facing first wing, said first wing and said retainer being formed with aligned holes, a threaded bolt extending through the hole in said first wing and threaded into the hole in said retainer, said bolt being turnable to vary the spacing between said first wing and said retainer, and coacting surfaces on said first wing and said retainer engageable with one another to limit turning of said retainer when said bolt is turned and to hold said retainer in a substantially fixed angular position relative to said first wing.

[29. A hardware assembly comprising first and second spaced members generally facing one another, first and second aligned holes extending through said first and second members, respectively, a threaded bolt extending non-threadably through said first hole and threaded into said second hole, said bolt having a head and being turnable to vary the spacing between said members, means integral with said bolt adjacent said first hole and captivating said first member against said head to restrict the first member from sliding relative to the bolt and thereby prevent the spacing between said members from being changed except by turning the bolt, and coacting surfaces on said members engageable with one another to limit relative turning of said members and to maintain said members in substantially fixed angular positions relative to one another.]

* * * * *

UNITED STATES PATENT AND TRADEMARK OFFICE

CERTIFICATE OF CORRECTION

PATENT NO. : RE. 30,717

DATED : August 25, 1981

INVENTOR(S) : Carl J. Dargene

It is certified that error appears in the above—identified patent and that said Letters Patent is hereby corrected as shown below:

On the first sheet of drawings, change "sheet 1 of 3" to -- sheet 1 of 4 --.

On the second sheet of drawings, change "sheet 2 of 3" to --sheet 3 of 4 --.

On the third sheet of drawings, change "sheet 3 of 3" to -- sheet 4 of 4 --.

Between the first and second sheets of drawings, insert the second sheet of drawings of original Patent No. 3,590,419 (containing Figs. 5 through 12) and identify this sheet as -- sheet 2 of 4 --.

Signed and Sealed this

Sixth Day of July 1982

[SEAL]

*Attest:*

GERALD J. MOSSINGHOFF

*Attesting Officer*

*Commissioner of Patents and Trademarks*

SHEET 2 of 4